Aug. 5, 1969       R. FELTS       3,459,917
SPARK HARDENING METHOD AND APPARATUS
Filed Oct. 23, 1965       2 Sheets-Sheet 1
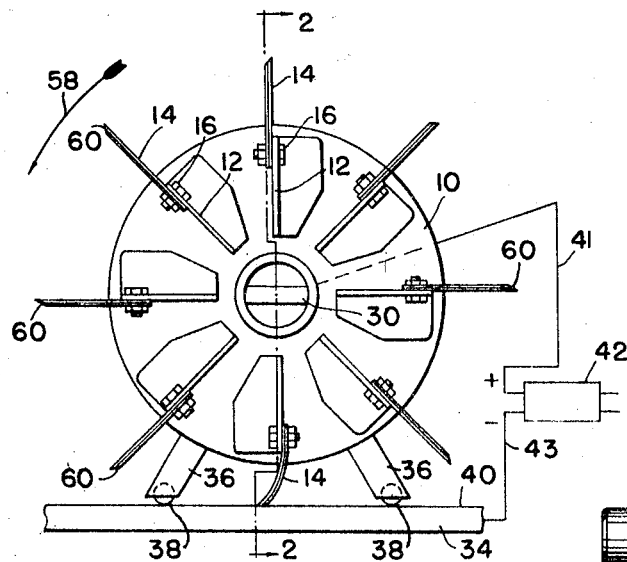
FIG.1
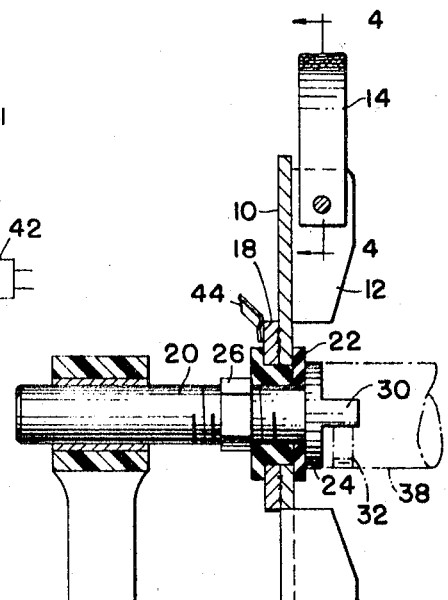
FIG.2
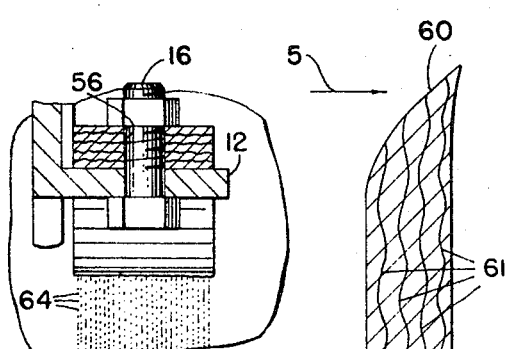
FIG.3
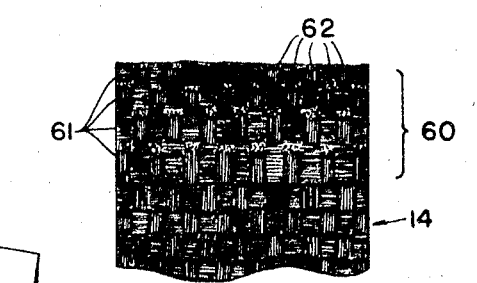
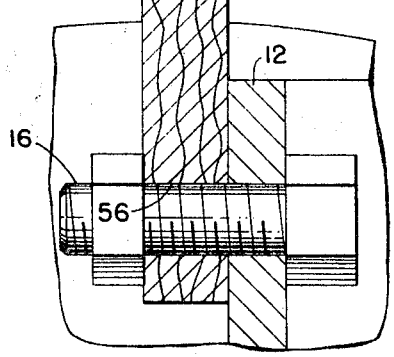
FIG.4
FIG.5
INVENTOR.
ROBERT FELTS
BY Whittemore,
Hulbert & Belnap
ATTORNEYS Aug. 5, 1969         R. FELTS         3,459,917
SPARK HARDENING METHOD AND APPARATUS
Filed Oct. 23, 1965                    2 Sheets-Sheet 2

INVENTOR.
ROBERT FELTS
BY Whittemore,
Hulbert & Belknap
ATTORNEYS

United States Patent Office 3,459,917
Patented Aug. 5, 1969

3,459,917
SPARK HARDENING METHOD AND APPARATUS
Robert Felts, Union Lake, Mich.
(Rte. 1, Box 591, Clarksburg, Md. 20734)
Filed Oct. 23, 1965, Ser. No. 503,533
Int. Cl. B23k 9/04
U.S. Cl. 219—76
24 Claims

ABSTRACT OF THE DISCLOSURE

The surface of a workpiece is hardened by sweeping a plurality of flexible graphite electrodes across the workpiece surface while maintaining a spark generating potential between the electrode and the workpiece so that during electrode contact sparks are drawn and electrode material is vaporized and absorbed into the workpiece.

---

This invention relates to a new and improved apparatus and method for treating both ferrous and nonferrous metal surfaces and particularly to a method and apparatus for forming a hard and wear resistant surface on a metal workpiece by rotary spark hardening.

At the present time considerable difficulty and expense are encountered in providing ferrous metal parts with hard and wear resistant surfaces according to conventional heat treating methods. It is almost impossible to harden the surface of non-ferrous metals satisfactorily.

Spark hardening has been suggested as an alternative way to harden the surfaces of metal workpieces but has not been fully accepted due to difficulties inherent in the present vibrating electrode spark hardening machines. In these machines a rigid electrode is vibrated in contact with the workpiece and indexed over the workpiece surface. An electric potential is maintained between the workpiece and the electrode so that with the vibration of the electrode there is an electrical discharge between the electrode and the workpiece with each vibration of the electrode. Material is transferred from the electrode to the workpiece surface both by means of the electrical discharge and the physical impact between the electrode and the workpiece so as to harden the workpiece surface.

Conventional spark hardening apparatus requires elaborate electrode holding and traversing mechanisms in order to assure that the electrode makes uniform and proper contact with the workpiece surface so as to assure uniform treatment theerof. Another difficulty with the vibrating electrode spark hardening method is that the power dissipation ability of the rigid electrode is so limited as to materially reduce the speed at which the workpiece surface can be treated.

The invention overcomes the disadvantages of the prior spark hardening apparatuses and methods by rotating a hub carrying a plurality of flexible graphite electrodes past the workpiece surface so that the electrodes made periodic tangential sweeping contact with the workpiece surface while a spark producing voltage is maintained between the electrodes and the workpiece. When the electrodes make contact with the workpiece a large number of sparks jump between the exposed graphite fibers in the electrodes and the workpiece surface so as to effectively spark harden the surface.

The flexible graphite electrodes are unexpectedly effective in spark discharge hardening of both ferrous and non-ferrous metals. They may be used with a greater current density than the conventional vibrating electrodes and thereby increase the speed with which the workpiece surface may be hardened while also improving the uniformity of the hardening. The electrode flexiblity assures proper tangential contact is made with the workpiece surface and eliminates the requirement for accurate positioning of the electrode in relation to the workpiece. The combination of the greater number of sparks generated with each contact between an electrode and the workpiece surface and the greater frequency of such contacts resulting from the rotation of a plurality of electrodes past the workpiece assures a more uniform random distribution of spark contacts with the workpiece surface and improved workpiece surface hardening.

Individual flexible graphite electrodes may be provided with a source of an alloying element carried therein so as to obtain an alloy of such element at the surface of the workpiece by spark hardening. In this way it is possible, for example, to obtain very hard carbide or boride surface alloying of both ferrous and non-ferrous workpieces.

Accordingly, an object of the invention is to provide a new and improved spark hardening apparatus.

Another object is to provide a spark hardening apparatus wherein a plurality of electrodes are rotated past and make sweeping contact with the surface of a metallic workpiece.

A further object of the invention is to provide a spark hardening apparatus utilizing electrodes made of flexible graphite material.

Another object is to provide a spark hardening apparatus wherein a plurality of spaced flexible graphite electrodes are rotated so as to sweep past the surface of the workpiece.

A still further object is to provide an improved flexible graphite electrode for use in a spark hardening apparatus.

Another object is to provide an improved method of spark hardening the surface of a workpiece.

The foregoing as well as other objects will become more apparent as this description proceeds, especially when considered in connection with the accompanying drawings illustrating a preferred embodiment of the invention wherein:

FIGURE 1 is a side elevational view of a spark hardening apparatus according to the invention;

FIGURE 2 is a vertical sectional view taken along the line 2—2 of FIGURE 1;

FIGURE 3 is a partial sectional view taken along the line 3—3 of FIGURE 2;

FIGURE 4 is a sectional view taken along the line 4—4 of FIGURE 2;

FIGURE 5 is an enlarged view taken in the direction of arrow 5 of FIGURE 4;

Figure 6:
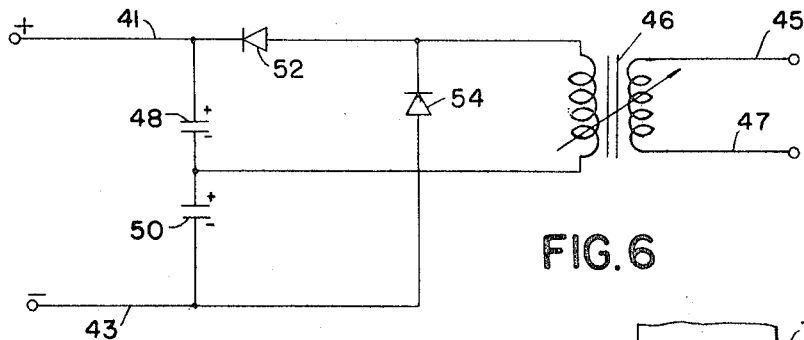
FIGURE 6 is a circuit diagram for a power supply unit used in the invention.

As shown in the drawings, a spark hardening apparatus according to the invention utilizes a metal rotary hub 10 having radial vanes 12 cut out from the body thereof. Flexible graphite electrodes 14 are bolted to the outer portions of vanes 12 by means of nuts and bolts 16 and project radially outwardly therefrom past the outer circumference of the hub 10. The hub is provided with a contact ring 18 at the inner portion thereof and is mounted on rotatable shaft 20 by means of an insulating grommet 22 which is held on the shaft between head 24 and nut 26. A rotatable drive shaft 28 is attached to key 30 of shaft 20 by means of screw 32 so as to rotate the shaft 20 and hub 10 therewith.

The hub 10 may be positioned relative to workpiece 34 by means of legs 36 which are journalled on shaft 20 by means of a bearing and which carry rollers 38 at the outer ends thereof so as to facilitate movement of the hub over the workpiece surface 40. The legs 36 may be of a type adjustable in length so as to make it possible to position the hub relative to the workpiece surface 40 in order to compensate for wear of the electrodes 14.

An electric power supply 42 maintains a spark generating voltage between the electrodes 14 carried by hub 10 and the workpiece 34. One output 41 of the power supply 42 is connected to brush 44 which wears against ring contact 18 of hub 10. The bolts 16 make electrical contact between the electrodes 14 and vanes 12 so that there is a closed circuit between the output 41 of the power supply 42 and the electrodes 14. The other power supply output 43 is connected directly to the workpiece.

The power supply illustrated at FIGURE 6 of the drawings provides a capacitance discharge direct current output between the electrodes 14 and the workpiece 34. In the power supply an alternating current output, which may be 110 volt 60 cycle AC current, is connected to the input leads 45 and 47 of the primary winding of variable transformer 46. The secondary winding of the transformer 46 is connected to power capacitors 48 and 50 through two silicon diode rectifiers 52 and 54 as shown so that each half wave of the AC output from the secondary winding of the transformer charges one of the capacitors 48 and 50 with the result that a doubled direct current output voltage is maintained between the electrodes 14 and the workpiece 34.

As illustrated in the drawings, the positive output of the power supply 42 is connected to the electrodes 14 and the negative output of the power supply 42 is connected to the workpiece 34. For many applications it is desirable to maintain this polarity with the electrodes being positive relative to the workpiece. However, this is not essential since spark hardening will occur in many applications when the polarity is reversed so that the electrodes are negative relative to the workpiece and also when an alternating current potential of the appropriate value is maintained between the electrodes and the workpiece.

When spark hardening is performed according to the invention and a DC potential is maintained between the electrodes and the workpiece, it has been found particularly advantageous to utilize a capacitance discharge power supply similar to that illustrated in FIGURE 6 of the drawings. This is because the capacitors 48 and 50 establish an output circuit particularly conducive to producing a spark discharge between the electrodes and the workpiece as opposed to an arc discharge therebetween.

The electrodes 14 are made of layers of woven flexible graphite fibers held together by an insulating and heat resistive matrix material, such as silicone rubber. As illustrated in the drawings and particularly in FIGURE 5, the electrodes may be made up of four layers 61 of woven flexible graphite fibers. These layers are shown somewhat schematically in FIGURE 4. The layers are pressed closely together and are impregnated with the matrix material which holds them together to form the individual electrodes.

During operation of the spark hardening apparatus the hub 10 is rotated by shaft 28 in the direction of arrow 58 as shown in FIGURE 1 so that the electrodes 14 make individual tangential sweeping contact with the surface 40 of the workpiece. Such contact wears the outer ends of the electrodes so as to form an essentially flat work surface 60 in which, as shown in FIGURE 5, there are a large number of exposed graphite fibers or spark points 62 which make contact with the workpiece surface 40 each time the electrode is swept thereby. The flexibility of the electrodes 14 assures that the work surfaces 60 are brought into intimate contact with the workpiece surface 40 as the hub is rotated relative thereto. The spark producing voltage potential maintained between the electrodes and the workpiece by the power supply causes a large number of sparks to jump between the exposed spark points 62 and the workpiece surface as the hub rotates and brings the work surfaces 60 of the electrodes 14 in sweeping contact therewith. The electrodes 14 are spaced around the circumference of hub 10 so that each work surface 60 thereof contacts a separate portion of the workpiece surface 40 as the electrodes are swept thereby.

The high spark temperature of each spark drawn between the electrodes and the workpiece vaporizes a small amount of the electrode material and also heats and melts a small spark contact or puddle at the point where it reaches the workpiece surface. The vaporized electrode material is metallurgically absorbed into the molten workpiece surface at this time and forms an alloy therewith. The very small molten alloyed puddle is rapidly cooled by the workpiece so as to form a very small hardened area on the workpiece surface. The area immediately surrounding each puddle is heat tempered due to energy dissipated in the spark discharge and may be materially hardened thereby. It should be noted that the absorption of vaporized material into the puddle results in a compositional change in that portion of the workpiece, while hardening by heat tempering does not alter the composition of the workpiece.

Although the area of each alloyed puddle 64 is small, the large number of sparks drawn between the rotating electrodes and the workpiece during contact therebetween results in a large number of puddles and effective hardening of the workpiece surface. The random distribution of the spark points 62 on the work area 60 of each electrode assures that there is a random uniform distribution of puddles formed on the workpiece surface 40 so as to assures that there is a random uniform distribution of so as to bring the electrodes 14 in contact with the entire workpiece surface, such surface is provided with a uniform hardening as a result of the large number of sparks drawn between the spark points 62 of the electrodes and the workpiece surface.

Figure 7:
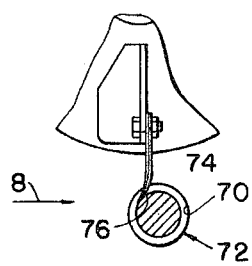
FIGURE 7 is a partial view showing an application of the invention.
Figure 8:
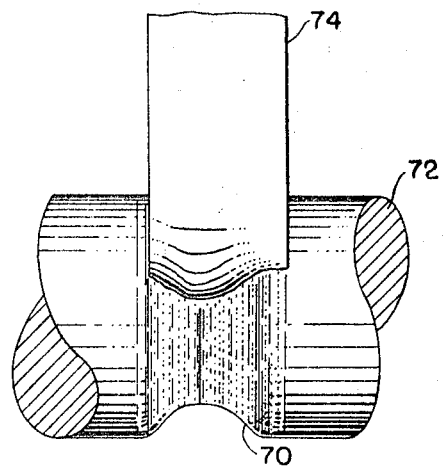
FIGURE 8 is an enlarged view taken in the direction of arrow 8 of FIGURE 7.

As shown in FIGURES 1–3 of the drawings, the spark hardening apparatus may be used to harden the flat surface of a workpiece by moving the hub 10 over the surface while using the legs 36 to maintain the hub at the proper distance from the surface so that the work area 60 of the electrodes 14 make proper sweeping contact therewith. An apparatus according to the invention may also be used to spark harden rotary or curved surfaces as illustrated in FIGURES 7 and 8. There a groove 70 in rod-like workpiece 72 is spark hardened by rotating a number of flexible graphite electrodes 74 past the groove while the workpiece 72 is being rotated slowly about its own axis so that the electrodes 74 make contact with the entire inner surface of the groove 70. It should be noted that in this case the work surface 76 of the electrodes 74 conforms to the interior configuration of the groove 70 so that the electrodes make sweeping contact with the groove.

While the spark hardening apparatus disclosed herein rotates the electrodes past the workpiece surface, the invention is not limited to spark hartening by rotary means. The electrodes may be carried on a travelling belt or other means whereby they may be brought into contact with the workpiece surface.

In operating a spark hardening machine according to the invention it is important to maintain the proper voltage between the electrodes and the workpiece and also to rotate the hub past the workpiece at the appropriate speed so as to obtain effective spark hardening. Although spark hardening has been found to occur throughout a voltage range of from approximately 6 to 600 volts, rotary spark hardening utilizing electrodes as disclosed herein has been found most effective when an open circuit voltage of between approximately 80 to 210 volts DC is maintained between the electrodes and the workpiece. In this regard it is convenient to refer to the open circuit voltage between the electrodes and workpiece since during operation of the machine the voltage between the electrodes and the workpiece fluctuates wildly due to the spark discharges as individual electrodes come into contact with the workpiece surface.

When an open circuit voltage of less than approximately 80 volts is maintained between the electrodes and the workpiece, the workpiece surface is unsatisfactorily hardened. The upper voltage limit is determined by the ohmic heating of the electrodes, which is such that when a voltage of greater than approximately 220 volts DC is maintained the electrodes become red hot and do not have time to cool in the intervals between successive contacts with the workpiece surface. In this condition the ohmic heating of the electrodes rapidly burns up the electrodes and renders the apparatus incapable of spark hardening the workpiece surface. In this regard it is important to note that the rotational velocity of the hub 10 enters into the determination of the maximum permissible open circuit voltage between the electrodes and the workpiece for effective spark hardening. If the hub is rotated slowly there is more time for the incandescent electrodes to cool prior to being brought again into contact with the workpiece so that a higher voltage may be utilized.

High voltage spark hardening has the advantage of providing a deeper hard layer on the workpiece surface although this layer is far rougher than that obtained by spark hardening at a lower open circuit voltage between the electrodes and the workpiece. Effective spark hardening has been achieved utilizing a 24 electrode hub rotated at 216 r.p.m., while other hubs having fewer electrodes have been effectively used at r.p.m.'s in the range of from 100 to 200 r.p.m. These rotational speeds are meant to generally indicate the range of rotational velocity which is effective for rotary spark hardening.

As described previously, the high spark temperature vaporizes the electrode material and melts a small puddle of the workpiece surface so that the vaporized electrode material may be absorbed into the puddle so as to form an alloy therein. In the case of the flexible graphite electrodes the vaporized carbon from the electrodes is absorbed into the puddle so as to form a hard carbide alloy with the molten workpiece metal. This carbide effectively hardens the workpiece surface.

As indicated by the following, low carbon steel is effectively surface hardened by treatment according to the invention. A number of tests have been performed utilizing an arrangement similar to that shown in FIGURE 7 of the drawings wherein a one-half inch diameter low carbon steel rod was rotated about its axis so that the surface thereof was swept by flexible graphite electrodes carried by a rotating hub so as to treat a portion of the rod surface having a width equal to the width of the electrodes. The hub carried 24 equally spaced 4-ply flexible graphite electrodes and was rotated past the rod at a fixed speed of 216 r.p.m. A direct current voltage having open circuit values of from 140 to 195 volts was maintained between the electrodes and the rod which was treated for periods of from 0.5 to 3 minutes. The degree of hardening achieved by the treatment was tested by a file test arrangement wherein a file was biased against the hardened surface and moved back and forth thereacross for ten minutes. The resultant hardness was indicated by the surface wear caused by such filing.

The results of the test were as follows:

| Test No. | Treatment time in minutes | Open circuit voltage in volts | File test wear in inches |
| --- | --- | --- | --- |
| 1 | 0.5 | 140 | 0.091 |
| 2 | 1 | 140 | 0.000 |
| 3 | 0.5 | 170 | 0.000-0.001 |
| 4 | 1 | 170 | 0.000-0.001 |
| 5 | 2 | 170 | 0.000 |
| 6 | 3 | 170 | 0.000 |
| 7 | 0.5 | 195 | 0.000-0.001 |
| 8 | 1 | 195 | 0.000 |
| 9 | 2 | 195 | 0.000 |
| 10 | 3 | 195 | 0.000 |

It will be seen that greater treatment time and higher open circuit voltage result in improved surface hardening.

In some instances it may be desirable to obtain an alloy at the workpiece surface other than a carbide workpiece metal alloy. In order to obtain such an alloy in the workpiece it is necessary to place the components of the desired alloy in the immediate spark environment so that the spark will vaporize these components and they will be absorbed into the molten metal puddle at the workpiece surface. Such alloying material may be provided by maintaining the contact surface of the workpiece in a gaseous, powder or slurry environment so that the sparks pass through the material providing this environment and vaporize the same for absorption into the workpiece surface. The alloying material may also be provided by bonding the same within the electrodes as, for example, indicated schematically in FIGURES 9 and 10 of the drawings.

Figure 9:
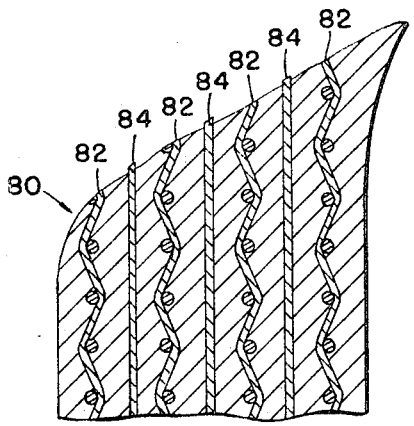
FIGURES 9 and 10 are sectional views of modified flexible graphite electrodes.

In FIGURE 9 the electrode 80 comprises a number of layers of flexible graphite cloth 82 embedded within a matrix such as silicone rubber. Also embedded within the matrix are a number of metal wires 84. These wires are of a particular metal which is desired to be alloyed in the workpiece surface. The sparks jumping between the wires 84 and the spark points of the graphite layers 82 and the workpiece vaporize the metal from wires 84 so that it may be absorbed and alloyed into the molten puddles of the workpiece surface.

Figure 10:
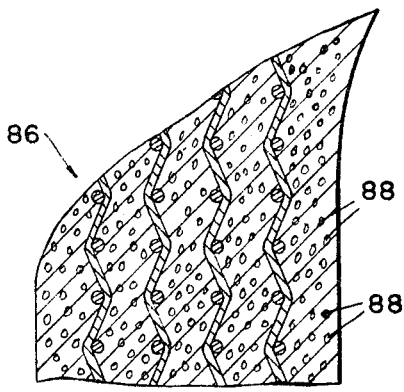

In FIGURE 10 an electrode 86 is illustrated in which particles 88 of the alloying material are distributed throughout the matrix of the electrode. This material is vaporized by the sparks and may be absorbed in the puddles to form the desired alloys.

For example, metal wires or particles or titanium, tungsten, chromium or any other suitable metal may be embedded within an electrode so as to obtain alloys of said metal in the workpiece surface. It has been found desirable to embed particles of glass or silicon carbide fibers within the electrode so as to obtain hard silicon carbide in the workpiece surface. Clearly, other suitable alloy sources may be embedded within the electrodes.

Obviously a large number of alloy sources may be provided on the surface of the workpiece so as to be vaporized by the sparks and alloyed to the workpiece. For example, the following alloying sources have been added to the work area with desirable results: sodium tungstate solution, titanium-water paste, water, $Cr_2O_3$-water paste, $CaCl_2$-water solution, sodium tetraborate solution, and other solutions and slurries including compounds of aluminum silicate and iron. Obviously these examples are merely indicative of a large number of alloying compounds which may be used with advantage in spark hardening according to the invention.

The flexible graphite electrodes described above may be modified in that the woven layers of graphite may be replaced by solid layers of flexible graphite held together by a suitable binder or by any other material which retains the requisite flexibility and conductivity required to assure that proper contact is made between the electrodes and the workpiece surface.

What I claim as my invention is:

1. Apparatus for spark hardening the surface of a workpiece comprising a circular hub, a plurality of electrodes carried by said hub, said electrodes being equally spaced around the circumference of said hub and projecting radially outwardly therefrom, each electrode being made of layers of flexible graphite fibers bound together by an insulating matrix and including a source of alloying material within said matrix, said graphite fibers being exposed at the outer ends of said electrodes so as to form a plurality of spark points, a capacitance discharge direct current electric power supply connected to said apparatus with the positive output of said power supply connected to said electrodes and the negative output of said power supply connected to the workpiece whereby said power supply establishes a spark generating voltage therebetween, and means for rotating said hub so that the electrodes make periodic sweeping contact with the workpiece surface whereby sparks jump between the spark points of the electrodes adjacent the workpiece and the workpiece surface, vaporize the graphite and alloying material within such electrodes, and heat the workpiece surface so that said vaporized graphite and alloying material are metallurgically absorbed into the workpiece surface.

2. Apparatus as described in claim 1 wherein said layers are woven from strands of flexible graphite fibers and said matrix is made of silicone rubber.

3. Apparatus as described in claim 1 wherein said source of alloying material comprises metal wires embedded within said electrodes and the ends of said wires form additional spark points.

4. Apparatus for spark hardening the surface of a workpiece comprising a rotatable hub, a plurality of electrodes carried by said hub, said electrodes being spaced around the hub circumference and projecting radially outwardly therefrom, each electrode being made of flexible graphite fibers and an insulating matrix, a direct current electric power supply connected to said apparatus with one output of said power supply connected to said electrodes and the other output of said power supply connected to the workpiece whereby said power supply establishes a spark generating voltage therebetween, means for rotating said hub so that the electrodes make periodic sweeping contact with the workpiece surface and whereby sparks jump between the electrodes and the workpiece surface, vaporize the graphite, and heat the workpiece surface so that said vaporized graphite is metallurgically absorbed into the workpiece surface.

5. Apparatus for spark hardening the surface of a workpiece comprising a rotatable hub, a plurality of fibrous flexible graphite electrodes carried by said hub, said electrodes being spaced around the hub circumference and projecting radially outwardly therefrom, an electric power supply connected to said electrodes and to the workpiece whereby said power supply establishes a spark generating voltage therebetween, means for rotating said hub so that the electrodes make periodic sweeping contact with the workpiece surface whereby sparks jump between the electrodes adjacent the workpiece and the workpiece surface, vaporize the electrode graphite, and heat the workpiece surface so that said vaporized graphite is metallurgically absorbed into the workpiece surface.

6. Apparatus for spark hardening the surface of a workpiece comprising an electrode support, a plurality of spaced fibrous flexible graphite electrodes carried by said support and projecting away therefrom, means for moving said support and electrodes relative to the workpiece so that the electrodes make periodic sweeping contact with the workpiece surface, and an electric power supply arranged to provide a spark producing potential between the electrodes and the workpiece whereby sparks jump between the electrodes and the workpiece surface, vaporize the electrode graphite, and heat the workpiece surface so that said vaporized graphite is metallurgically absorbed into the workpiece surface.

7. Apparatus as described in claim 6 wherein the output circuit of said electric power supply is capacitive.

8. Apparatus for spark hardening the surface of a workpiece comprising an electrode support, a plurality of spaced fibrous flexible electrodes carried by said support and projecting away therefrom, each of said electrodes having a deformable work surface for engaging and conforming to the surface of the workpiece, means for moving said support and electrodes relative to the workpiece so that the electrodes make periodic sweeping contact with the workpiece surface, and an electric power supply arranged to provide a spark producing potential between the electrodes and the workpiece whereby sparks jump between the electrodes and the workpiece surface, vaporize the electrode material and heat the workpiece surface so that said vaporized material is metallurgically absorbed into the workpiece surface.

9. Apparatus as in claim 8 wherein said flexible electrodes are made of high carbon content material.

10. That method of alloying the surface of a metal workpiece which comprises the steps of rotating a plurality of circumferentially spaced fibrous flexible graphite electrodes past the surface of a workpiece so as to bring each electrode into periodic sweeping contact therewith, maintaining a DC spark generating potential between said electrodes and said workpiece to induce sparks between the electrodes and the workpiece as the electrodes are rotated into contact therewith, vaporizing the electrode graphite by means of said sparks, heating said workpiece surface, and absorbing said vaporized graphite into said heated workpiece surface.

11. That method as described in claim 10 including the steps of maintaining the environment adjacent the workpiece surface rich in an alloying material, vaporizing said material by means of said sparks, and absorbing said vaporized material into said heated workpiece surface.

12. That method of alloying the surface of a metal workpiece which comprises the steps of moving a plurality of spaced fibrous flexible graphite electrodes past the surface of a workpiece so as to bring each electrode into periodic sweeping contact therewith, maintaining a DC spark generating potential between said electrodes and said workpiece to induce sparks between the electrodes and the workpiece as the electrodes are moved into contact therewith, vaporizing the electrode graphite by means of said sparks, heating said workpiece surface, and absorbing said vaporized graphite into said heated workpiece surface.

13. That method of hardening the surface of a workpiece which comprises the steps of moving a plurality of spaced fibrous flexible electrodes over the workpiece surface while maintaining the electrode work surfaces in conforming engagement with the surface of the workpiece, maintaining a spark generating voltage between said electrodes and said workpiece, and drawing sparks therebetween as contact is made between said electrodes and the workpiece surface.

14. That method of spark hardening the surface of a workpiece which comprises rotating a plurality of circumferentially spaced fibrous flexible graphite electrodes over the surface of a workpiece while maintaining a spark generating potential between said electrodes and said workpiece.

15. That method of spark hardening the surface of a workpiece which comprises sweeping a plurality of spaced fibrous flexible graphite electrodes over the surface of a workpiece while maintaining a spark generating potential between said electrodes and said workpiece.

16. An electrode for use in a spark hardening apparatus comprising layers of flexible graphite fibers bound together by a flexible insulating matrix, the ends of the graphite fibers of said layers being exposed on one side of the electrode so as to form a plurality of spark points.

17. An electrode as in claim 16 wherein a source of alloying material is embedded within said electrode.

18. An electrode for use in a spark hardening machine comprising a flexible graphite fiber embedded within a matrix of flexible insulating material, said fiber being exposed at the work area of said electrode so as to form at least one spark point.

19. An electrode wheel for use in surface treatment of a metallic workpiece comprising a metallic hub, an electric circuit contact located on said hub at the center thereof, said hub including a plurality of mounting means spaced around said hub, and a plurality of fibrous flexible graphite electrodes, each electrode being secured to one of said means and projecting outwardly therefrom past the outer circumference of said hub, said hub forming an electrically conductive circuit path between said contact and said electrodes whereby electric current is free to flow therebetween.

20. An electrode wheel for use in surface treatment of a metal workpiece comprising a rotatable hub, and a plurality of fibrous flexible electrodes carried by said hub, said electrodes being equally spaced around the circumference of the hub and projecting radially outwardly therefrom, said hub including means for connecting all of said electrodes to a power supply circuit.

21. Apparatus for spark hardening the surface of a workpiece comprising a fibrous flexible electrode projecting toward the workpiece and having a deformable work surface for engaging and conforming to the surface of the workpiece, means for moving said electrode relative to the workpiece so that the electrode makes sweeping contact with the workpiece surface, and an electric power supply arranged to provide a spark producing potential between the electrode and the workpiece whereby sparks jump between the electrode work surface and the workpiece surface, vaporize the electrode material and heat the workpiece surface so that said vaporized material is metallurgically absorbed into the workpiece surface.

22. That method of hardening the surface of a workpiece which comprises the steps of moving a fibrous flexible electrode over the workpiece surface while maintaining the electrode work surface in conforming engagement with the workpiece surface, maintaining a spark generating voltage between said electrode and workpiece, and drawing sparks between the electrode work surface and the workpiece as contact is made between said electrode and the workpiece.

23. That method as described in claim 22 including the step of periodically removing the electrode work surface from engagement with the workpiece surface.

24. That method as described in claim 22 wherein said electrode is formed of flexible graphite fibers.

References Cited

UNITED STATES PATENTS

| | | | |
|---|---|---|---|
| 3,097,291 | 7/1963 | Adcock | 219—76 |
| 3,268,705 | 8/1966 | Inoue | 219—76 |
| 3,277,266 | 10/1966 | Blaszkowski | 148—154 X |
| 3,277,267 | 10/1966 | Blaszkowski | 148—154 X |

FOREIGN PATENTS

| | | |
|---|---|---|
| 9,782 | 6/1888 | Great Britain. |

JOSEPH V. TRUHE, Primary Examiner

C. L. ALBRITTON, Assistant Examiner

U.S. Cl. X.R.

117—93; 219—130

PO-1050
(5/69)

UNITED STATES PATENT OFFICE
CERTIFICATE OF CORRECTION

Patent No. 3,459,917   Dated   August 5, 1969

Inventor(s)   Robert Felts

It is certified that error appears in the above-identified patent and that said Letters Patent are hereby corrected as shown below:

In Column 1, line 4, "591" should read --59I--.

In Column 4, line 33, "assures that there is a random uniform distribution of" should read --assure uniform hardening thereof. As the hub 10 is rotated--.

In Column 4, line 58, "hartening" should read --hardening--.

In Column 6, line 32, "or", second occurrence, should read --of--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents